Patented July 21, 1925.

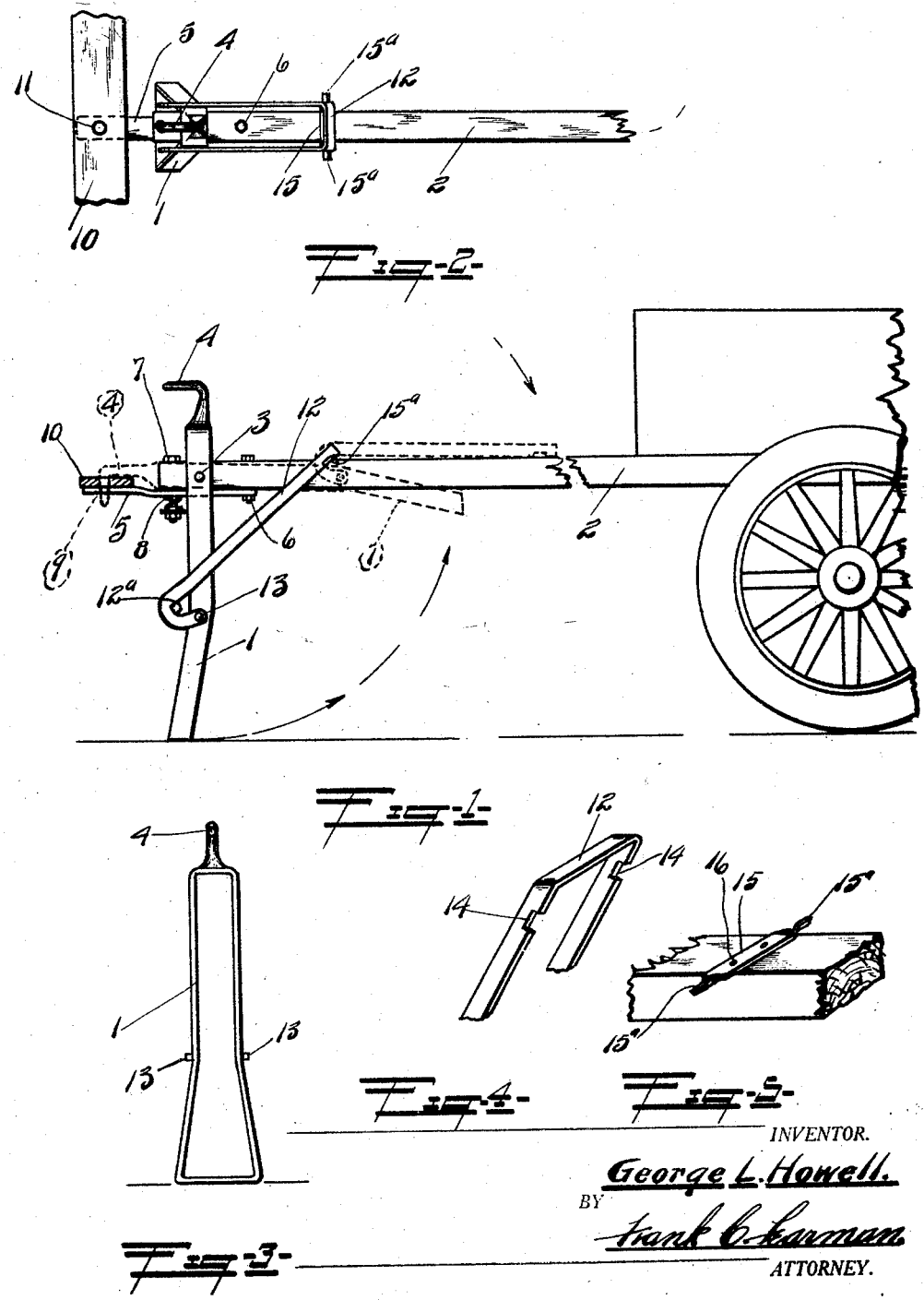

1,546,984

UNITED STATES PATENT OFFICE.

GEORGE L. HOWELL, OF MUNGER, MICHIGAN.

BRACE FOR FOLDING-LEG SUPPORTS.

Application filed June 5, 1924. Serial No. 717,936.

*To all whom it may concern:*

Be it known that I, GEORGE L. HOWELL, a citizen of the United States of America, and a resident of Munger, in the county of Bay and State of Michigan, have invented certain new and useful Improvements in Braces for Folding-Leg Supports, of which the following is a specification.

This invention relates to trailer hitches and the like, and particularly to means for bracing and rigidly holding the leg support in both open and folded position and is an improvement on my application for Letters Patent of the United States relating to "trailer hitches" filed under date of November 25, 1922, Serial No. 603,262.

The prime object of the invention is the provision of means for rigidly holding the supporting leg in substantially vertical position when it is swung down to form a support for the trailer tongue, after it has been detached from the power vehicle.

A further object is to design a very simple brace which rigidly holds the supporting leg in open position and which also automatically holds it tight against the draft member when swung up to closed position.

The above and other objects will appear as the specification progresses, reference being had to the accompanying drawing in which like reference numerals indicate like parts throughout the several views thereof.

In the drawing—

Fig 1 is a side view of the hitch attachment, the full lines showing the leg down and in position for supporting the tongue, the dotted lines illustrating it swung up against the tongue or draft member and connected to the power vehicle.

Fig. 2 is a top plan view of the trailer tongue only, the hitch attachment being shown in place thereon.

Fig. 3 is a front view of the leg.

Fig. 4 is a fragmentary isometric view of the brace.

Fig. 5 is a fragmentary isometric view of the trailer tongue illustrating the strap with which the brace cooperates.

This improvement relates to a means for holding the folding supporting leg in open and closed positions, and in order that the nature of the invention may be thoroughly understood, I shall give a brief summary of the operation and construction of the trailer hitch.

The trailer hitch proper comprises a leg 1 preferably formed of bar iron and pivotally connected to the trailer tongue 2 at the point 3, the lower end of the leg being spread and spaced to form a larger supporting area, the top being formed with a hook or bill 4 which projects laterally therefrom.

A flat strap of bar iron 5 is secured to the underside of the tongue or draft member by means of bolts 6 or the like, a similar bolt 7 being provided near the end of the tongue and a coiled spring 8 is interposed between the tongue and the strap to supply sufficient resiliency to allow the draft member to accommodate itself to the unevenness of the roadway, over which it travels, the free end of the strap extending beyond the end of the tongue and is provided with an opening 9 therein, which when the leg is swung up against the draft member, is in alinement with and is adapted to receive the hook or bill on the end of the supporting leg.

A flat bar or strap member 10 is secured to the power driven vehicle (not shown) and this is also provided with an opening 11 therein adapted when the trailer is connected to the power vehicle to be interposed between the bar or strap 5 and the hook and receive the bill thereof. Heretofore no means have been provided for bracing and preventing the leg folding when the trailer is set on uneven ground or on a grade, and separate and expensive locking means were necessary to hold the leg in raised or folded position. These objectionable features I have overcome by providing a yoke shaped brace 12 pivotally connected intermediate the length of the leg by means of bolts, or studs 13 may be provided on the leg if desired. This yoke is formed as clearly shown in Fig. 1, of the drawing, the lower end of the legs being offset and pivotally secured to the supporting leg, the upper end or yoke resting on the tongue when the leg is down, small notches 14 being formed in the legs directly adjacent the top of the yoke and are adapted to engage and seat the ends of a strap 15 which is secured to the tongue by means of bolts 16, and should the trailer be set on a down grade it will be apparent that the leg will not fold regardless of any trailer movement until the tongue is raised, and the brace swung forwardly to disengage the notches 14 from the strap 15, and when the leg is swung upwardly, the offset portion 12ª of the brace engages with the ends of the strap 15, thereby locking the leg in raised position. This offset portion engaging the strap is cam shaped and effectively and securely locks the leg in folding position, and harsh jolting of the tongue only serves to lock it more tightly due to the cam shaped offset and the overhang of the brace when folded. It will also be noted that the ends of the strap 15 are slightly bent as shown at 15ª to facilitate the locking.

The draw-bar on a tractor is much closer to the ground than the member 10 would be on a truck or passenger vehicle, and when used in connection with a tractor the leg and brace are made considerably shorter and in proportion, the ground engaging portion of the leg being preferably made of a piece of sheet metal so that a larger bearing surface can be secured. The action is however indentically the same regardless of the direction of swing.

From the foregoing description it will be obvious that I have perfected a very simple, economical and efficient brace for rigidly holding a leg support in either open or folded position.

What I claim is:—

1. The combination with a draft member having a pivoted supporting leg, of a strap secured to said draft member, and offset connecting means pivotally connected to said leg and detachably engaging said strap for rigidly holding the leg in either upright or folded position.

2. The combination with a draft member having a pivoted supporting leg, of a horizontally disposed strap secured to the draft member, a yoke embracing said member, the ends of the yoke being offset and pivotally connected to the leg, and notches in the yoke engaging said strap for rigidly holding the leg in upright position.

3. The combination with a draft tongue having a supporting leg pivotally connected thereto, of a horizontally disposed strap secured to the tongue, a yoke embracing said tongue and formed with offset connecting means pivotally connected to the leg, and providing a seat for engagement with the strap when the leg is folded, and notches in the yoke adapted to engage the end of the horizontally disposed strap when the leg is in upright position.

4. The combination with a draft tongue having a pivoted supporting leg connected thereto, of a strap secured to the tongue, a yoke embracing the tongue and formed with curved ends adapted to be pivotally connected to the leg intermediate its length, notches on the yoke adapted to engage the strap to hold the leg in upright position when open, the curved portions cooperating with the strap to lock the leg against the tongue when folded.

In testimony whereof I affix my signature.

GEORGE L. HOWELL.